US008822890B2

(12) United States Patent
Day et al.

(10) Patent No.: US 8,822,890 B2

(45) Date of Patent: Sep. 2, 2014

(54) FOOD HEATING AND SERVING APPLIANCE

(75) Inventors: Adam Day, Boynton Beach, FL (US); Jeffrey Juskowich, Mableton, GA (US)

(73) Assignee: Sunbeam Products, Inc., Boca Raton, FL (US)

( * ) Notice: Subject to any disclaimer, the term of this patent is extended or adjusted under 35 U.S.C. 154(b) by 106 days.

(21) Appl. No.: 13/537,847

(22) Filed: Jun. 29, 2012

(65) Prior Publication Data

US 2013/0001216 A1 Jan. 3, 2013

Related U.S. Application Data

(60) Provisional application No. 61/502,947, filed on Jun. 30, 2011.

(51) Int. Cl.

*H05B 3/06* (2006.01)
*H05B 3/68* (2006.01)
*A47J 37/12* (2006.01)

(52) U.S. Cl.

CPC ............ *H05B 3/68* (2013.01); *H05B 2203/028* (2013.01)
USPC .............................. 219/521; 219/438; 99/413

(58) Field of Classification Search

USPC ................. 219/521, 438, 432–4, 428–9, 436; 99/413, 416, 367, 448
See application file for complete search history.

(56) References Cited

U.S. PATENT DOCUMENTS

| | | | | |
|---|---|---|---|---|
| 2,897,330 A | | 7/1959 | Hopkins | |
| 3,636,299 A | * | 1/1972 | Stewart, Jr. | 219/201 |
| D260,958 S | | 9/1981 | Nishikawa | |
| 5,077,460 A | | 12/1991 | Rocha et al. | |
| 5,865,098 A | | 2/1999 | Anelli | |
| 6,188,046 B1 | | 2/2001 | Barrow | |
| 6,259,068 B1 | | 7/2001 | Barrow | |
| 6,373,031 B1 | | 4/2002 | Barrow | |
| 6,593,552 B1 | | 7/2003 | Li | |
| 6,653,602 B2 | | 11/2003 | Li | |
| D488,670 S | | 4/2004 | Chan | |
| D507,452 S | | 7/2005 | Chan | |
| 6,927,365 B2 | | 8/2005 | Li | |
| D566,459 S | | 4/2008 | Doo | |
| D567,016 S | | 4/2008 | Chan | |
| D614,909 S | | 5/2010 | Lavy | |
| D617,134 S | | 6/2010 | Perkins | |
| D640,086 S | | 6/2011 | Day et al. | |

* cited by examiner

*Primary Examiner* — Shawntina Fuqua

(74) *Attorney, Agent, or Firm* — Michael J. Corrigan

(57) ABSTRACT

A food heating and serving appliance is provided including generally circular upper and base portions with the upper portion being rotatably mounted to the base portion. The upper portion has a plurality of independently controlled heated food containers mounted in cavities on the upper portion. The upper portion is freely rotatable relative to the base portion for rotating a preferred heated container to the front of the appliance for serving convenience. Each of the food containers may include a lid with a handle for covering the heated containers. A pivoting cover attached to the base portion may be folded to engage a pocket on a sidewall of the housing when in alignment for preventing relative rotation between the upper and base portions. The pocket may also serve to store the cord plug when the power cord is retracted into the base portion and the cover is folded into the pocket.

20 Claims, 7 Drawing Sheets

FOOD HEATING AND SERVING APPLIANCE

RELATED APPLICATIONS

This application claims priority to U.S. Provisional Patent Application No, 61/502,947 filed on Jun. 30, 2011. The entire disclosure of U.S. Provisional Patent Application No. 61/502,947 is incorporated herein by reference.

FIELD OF THE INVENTION

The invention relates to food heating appliances, and in particular, to a food heating appliance which has a plurality of heated containers disposed in cavities on a rotating carousel.

BACKGROUND OF THE INVENTION

Food heating and serving appliances are generally known and typically include a container such as a ceramic or stoneware container received in a housing. A transparent glass or plastic lid may be removably mounted on the container. An electrically-operated control and heating element may be provided for heating food stuffs placed within the container. The housing may include handles extending therefrom to allow a user to transport the heating appliance.

Food heating appliances and food warmers having more than one container disposed in a housing are also known. For example, it is known to have food heating and appliances having two, three and four containers disposed in a metal housing. The container may be arranged in various arrangements but typically some of the containers wind up being disposed more towards the rear of the housing. As such, it is not always convenient to serve food from these containers.

SUMMARY OF THE INVENTION

In an embodiment, there is provided an appliance including a first portion, a second portion rotatably mounted to and rotatable relative to the first portion, an electrical power cord which when connected to a source of electrical power supplies the electrical power to at least one electrical component associated with the first portion, a pocket in the first portion, and a cover pivotally connected to the second portion that folds between unfolded and folded positions, said cover that when aligned with the pocket is foldable into the pocket and snaps into therein, said cover enclosing the pocket and preventing relative rotational movement of the upper portion when folded into and snapped into the pocket.

In another embodiment, there is provided a food heating appliance including an upper portion, at least one container removably mounted in a cavity of the upper portion for holding foodstuff, at least one heating element associated with each at least one container for heating the foodstuffs in the associated at least one container, a base portion, said upper portion rotatably mounted on and rotatable relative to the base portion, and a rotary electrical joint that transfers electrical power from an electrical power cord in the base portion to the at least one heating element associated with the at least one container in the rotatable upper portion.

In another embodiment, there is provided a latching arrangement for an appliance including a pocket formed in a first portion of the appliance, a cover pivotally connected to a second portion of the appliance rotatably connected to the first portion, the cover folding between unfolded and folded positions, the cover that when aligned with the pocket is foldable into the pocket and snaps into therein, and the cover enclosing the pocket and preventing relative rotational movement of the first portion when folded into and snapped into the pocket.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

Figure 1:
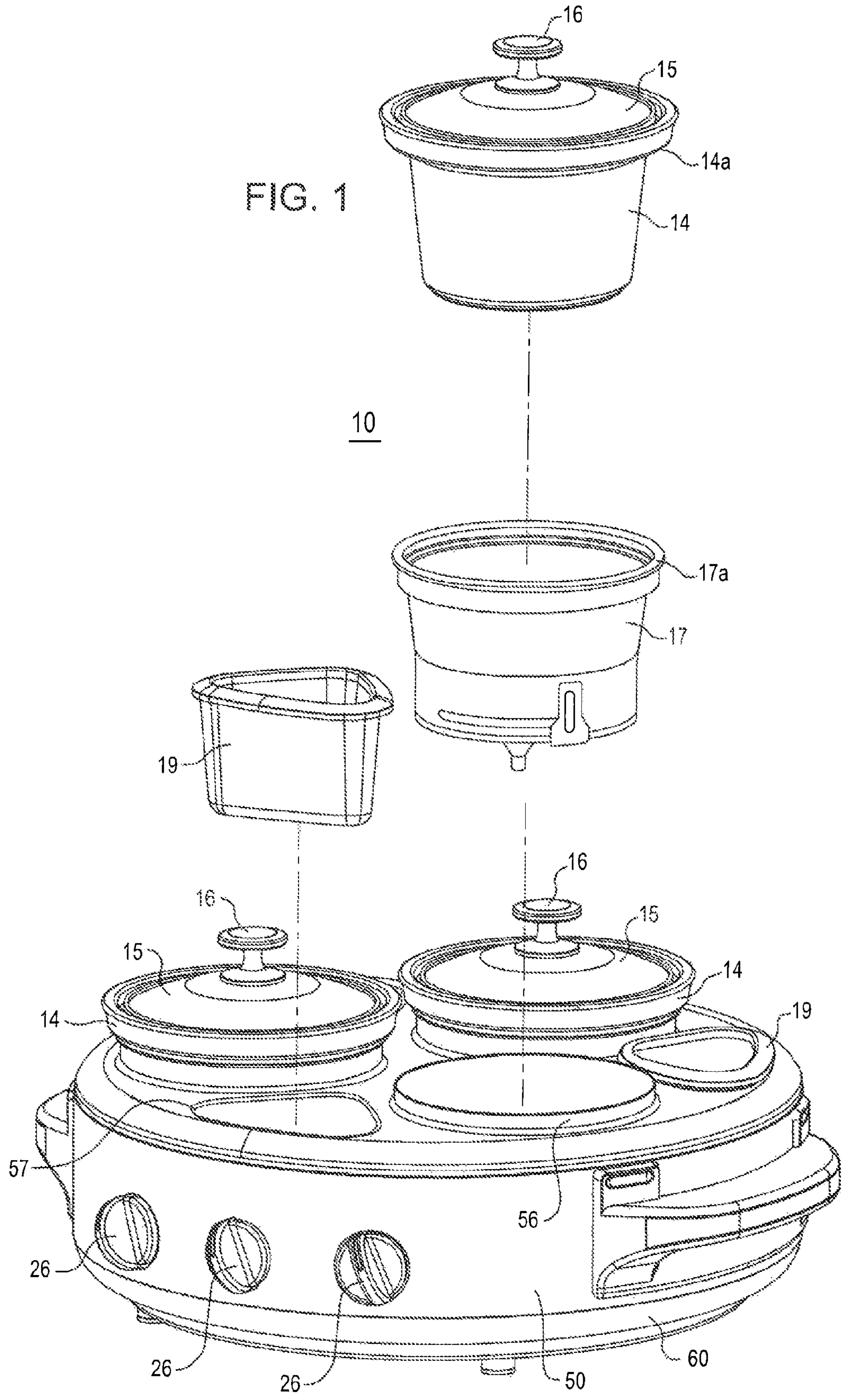
FIG. 1 is a partially exploded front perspective view of a food heating and serving appliance.
Figure 3:
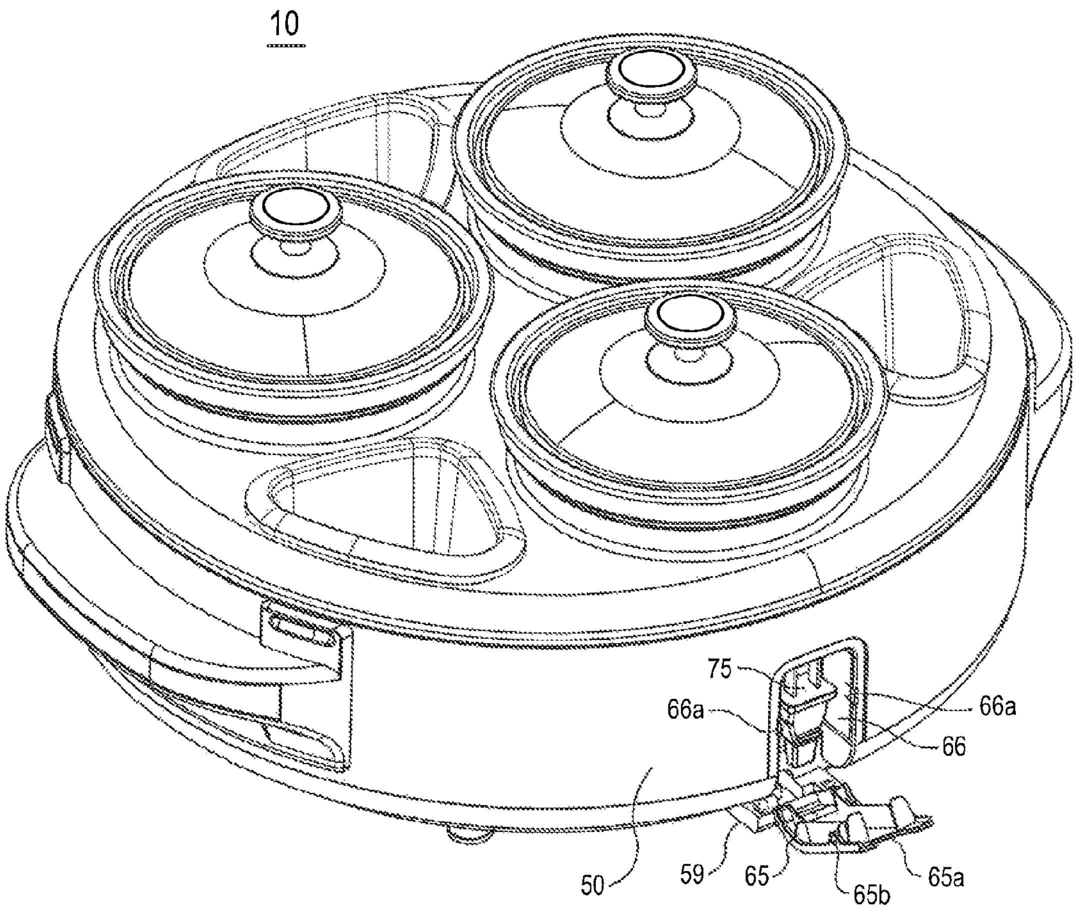
FIG. 3 is a rear view of the appliance of FIG. 1 illustrating the latching and cord storage arrangement.
Figure 3A:
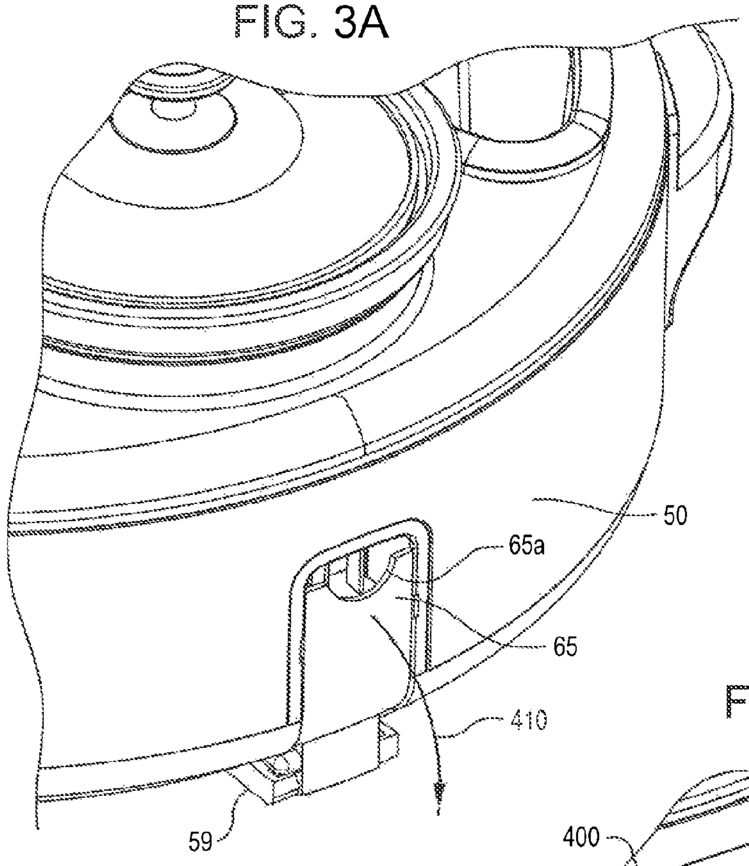
Figure 4:
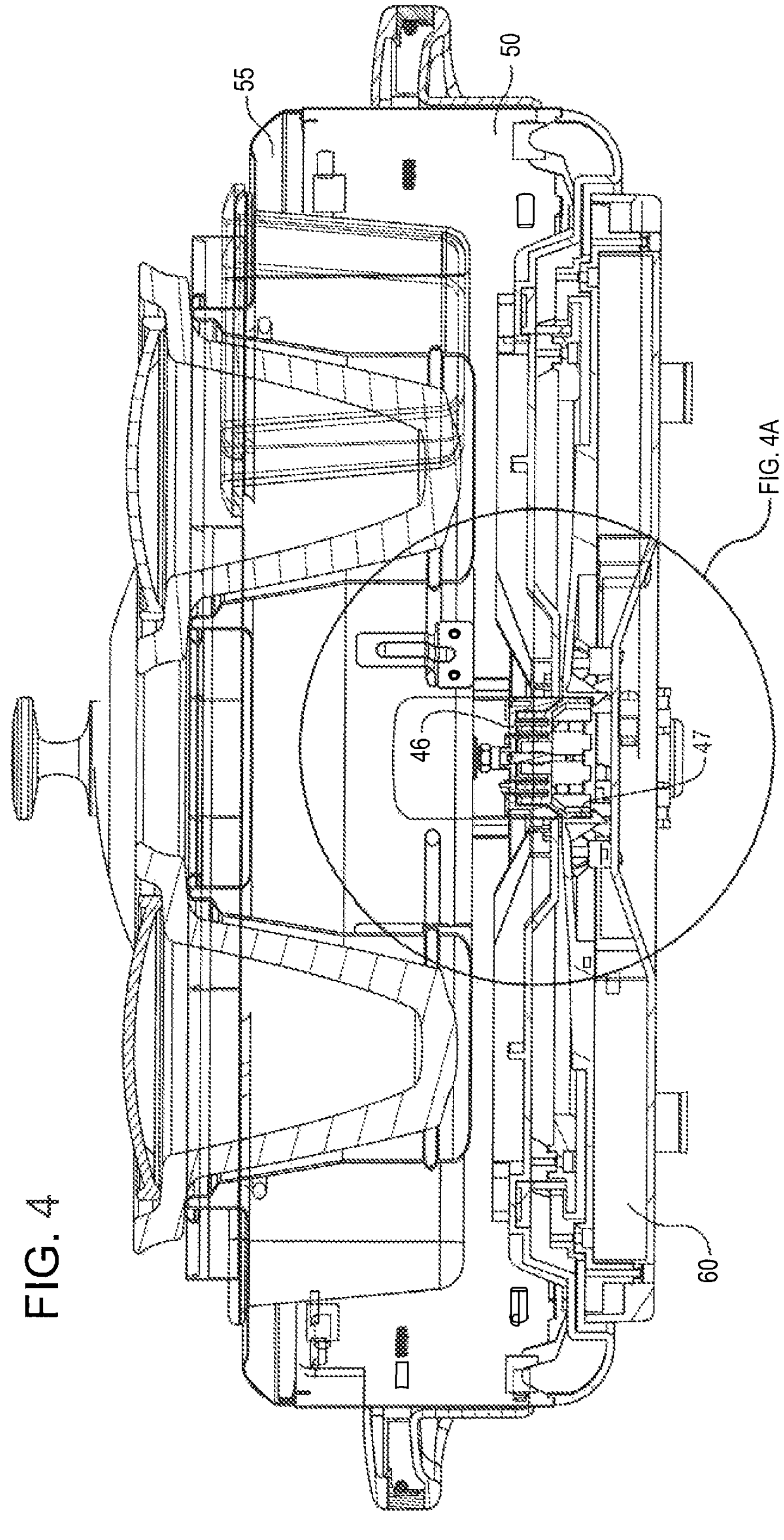
Figure 4A:
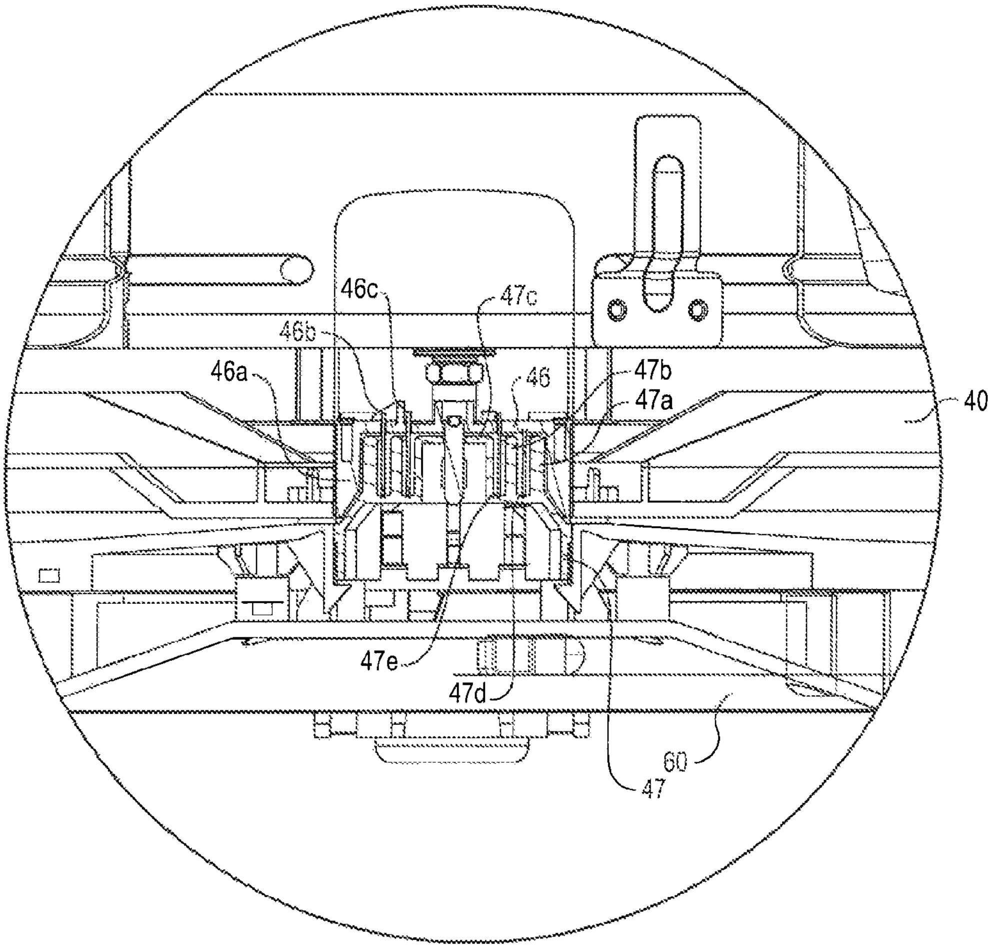
Figure 5:
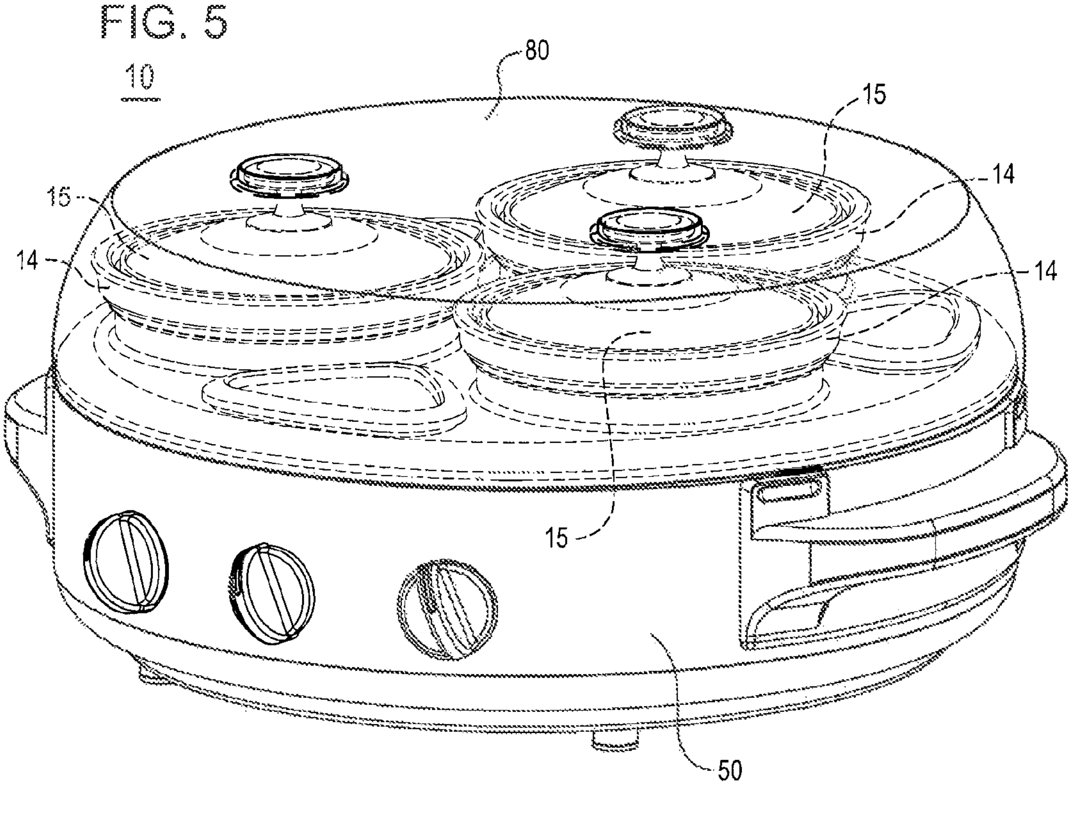

FIG. **3*a* is a partial view of the appliance of FIG. 3** illustrating the latching and cord storage arrangement in a latched configuration with the power cord and plug retracted and stored;

FIG. **3*b* is a partial view of the appliance of FIG. 3** illustrating the latching and cord storage arrangement in an unlatched configuration with the power cord and plug extended;

FIG. **3*c* is a partial view of the appliance of FIG. 3** illustrating the latching and cord storage arrangement in a latched configuration with the power cord and plug extended;

FIG. 4 is a cross-sectional view of the appliance of FIG. 1;

FIG. 4A is an enlarged portion of the cross-sectional view of FIG. 4; and FIG. 5 is a perspective view of the appliance of FIG. 1 with an accessory howl cover in a storage configuration.

DESCRIPTION OF THE INVENTION

Figure 2:
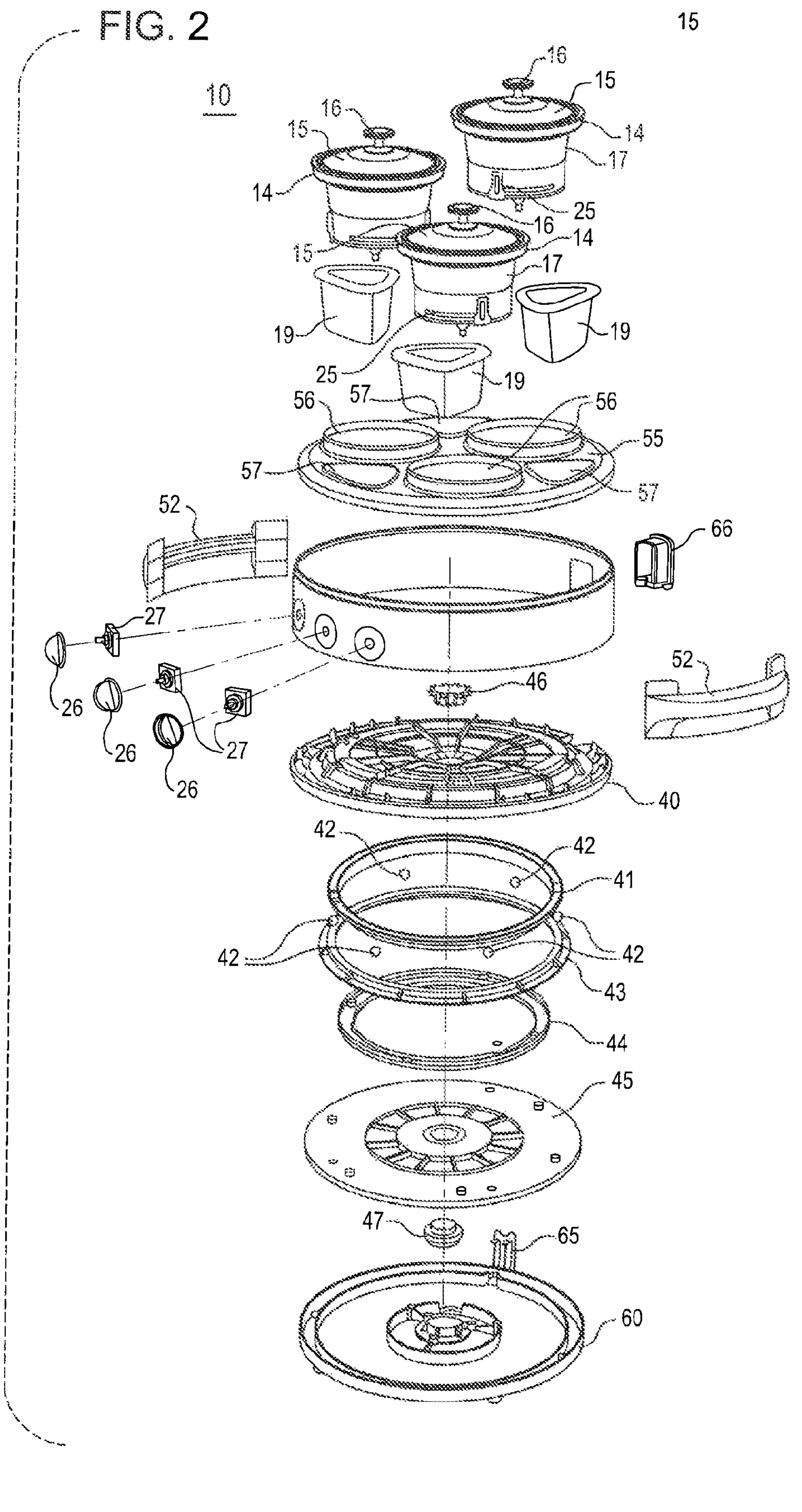
FIG. 2 is an exploded front perspective view of the appliance of FIG. 1.

Referring now to the drawing figures in which like reference designators refer to like elements, there is shown in FIGS. 1-2 an embodiment of a food heating and serving appliance 10. It should be noted that in the illustrated embodiment that the appliance 10 is a food heating and serving appliance but this is not meant to be limiting as the appliance 10 may be virtually any kind of appliance or device.

In this embodiment, the appliance 10 includes a generally circular cooker housing 50 and three heated containers 14 which are independently heated as described below. In another embodiment, there is a plurality of at least two heated containers 14 but this is not meant to be limiting as there could be many different variations of the number of heated containers 14. Each of the heated containers 14 may have a removable lid 15 with a handle or knob 16 for grasping the lid 15. The lid 15 is for covering an interior volume of the heated container 14 were food items are placed during heating the container 14 for cooking and/or warming provided by heating elements (not shown) in the housing 50. The lid 15 aids in keeping heat and moisture inside the container 14 during and after heating. The containers 14 may be comprised of stoneware materials as is known to one of ordinary skill in the art or other suitable materials.

The containers 14 are spaced evenly apart one another 120° circumferentially on a circular plate that forms the upper housing 55 of the housing 50. Both the upper housing 55 and the housing 50 may be formed from sheets of stainless steel or other suitable material. In an embodiment, the housing 50 and the upper housing 55 collectively form a carousel that is mounted on a base 60. The carousel is selectively rotatable 360° in either clockwise or counter-clockwise directions for serving convenience of each the containers 14. The containers 14 are removably fitted into a cooking container cavity comprised of preferably an aluminum or stainless steel insert 17 inserted into an opening 56 in the carousel or upper housing 55. Each of the inserts 17 may include a lip 17*a* where a rim 14*a* of the containers 14 may be seated when the containers 14 are fitted into the inserts 17. In an embodiment, there may be dispersed between each of the containers 14 a non-heated container 19 provided for holding sauces, dips and the like for serving with the food items being cook and/or warmed in the containers 14. The containers 19 likewise may be fitted into a cavity 56 in the upper housing 55 with or without a liner comprised of aluminum or stainless steel (not shown).

In an embodiment, each of the containers 14 may include a heating element 25 attached to its outer sidewall for heating the contents therein. The heating element 25 may be attached to the sidewall of the individual container 14 with a spring biased metal band or other attachment meats. Each of the heating elements 25 is independently controlled and receives electrical power via wiring connected to a respective rheostat 27. Each rheostat 27 may include a control knob 26 that is disposed on the front face of the housing 50. The rheostats 27 receive electrical power via a power cord 70 connected to an electrical plug 75. The electrical plug 75 may be connected to a conventional source of electrical power such as household current 120 vac or other current source. In another embodiment, the rheostats 27 may be replaced with electronic controls (not shown) including electronic switches (not shown) and a microprocessor (not shown) including logic for controlling the heating elements 25 in pre-programmed sequences selected through the electronic switches (not shown).

In an embodiment, a pair of thermally insulated handles 52 are disposed on opposite sides of the housing 50 for transporting the appliance 10 even while hot to the touch. The handles 52 have a curved inner surface that generally conforms to the curvature of the housing 50. The handles 52 may be comprised of heat-resistant materials such as bakelite and the like known to one of ordinary skill in the art.

As described above, the housing 50 and the upper housing 55 50 may be freely rotatable about the base 60 so that the containers 14 may be rotated into a desired serving position manually. In another embodiment, the housing 50 and the upper housing 55 may be rotated by a motor (not shown) controlled by the electronic controls (not shown). The electronic controls (not shown) may rotate the housing 50 and the upper housing 55 in a desired sequence such as a pre-determined number of degrees of rotation so that a desired container 14 containing a food item is rotated into a desired serving position.

Referring now also to FIGS. 3 and 3A-3C, the appliance 10 may include a locking feature 65 that is pivotally connected to the base 60 for locking the housing 50 and the upper housing 55 relative to the base 60 for storage and transport. The locking feature 65 is pivotally attached to a flange 59 extending from the bottom of the base 60. The locking feature 65 snaps into a pocket 66 formed in the sidewall of the housing 50 when the locking feature 56 is aligned with the pocket 66. The pocket 66 is formed from a cutout in the sidewall of the housing 50 and has a pocket liner 66 attached thereto. The locking feature 65 may include ears 65*b* with a detent that snap-fit into recesses 66*a* on the interior wall of the pocket liner 66. The pocket 66 may also serve to provide storage to the power cord plug 75 on the distal end of the power cord 70. In the storage configuration, the plug 75 may be stored in the pocket 60 and the locking feature 65 moved to the closed position to cover the plug 75.

Figure 3B:
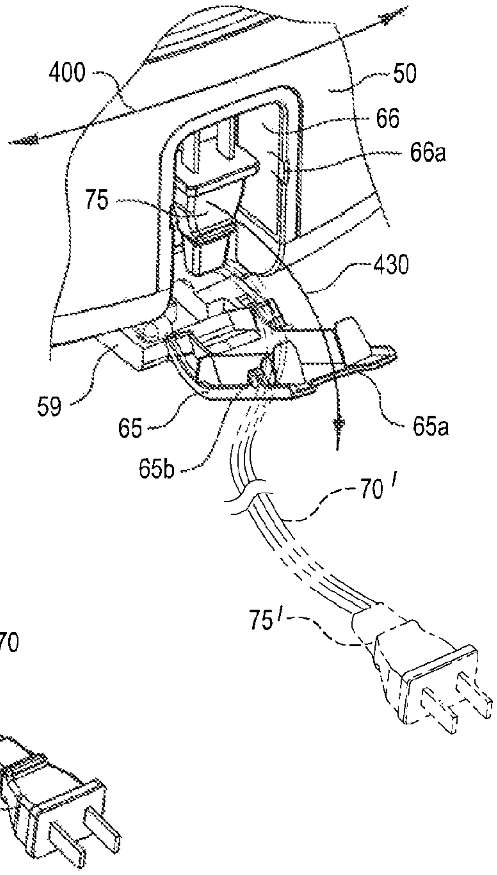
Figure 3C:
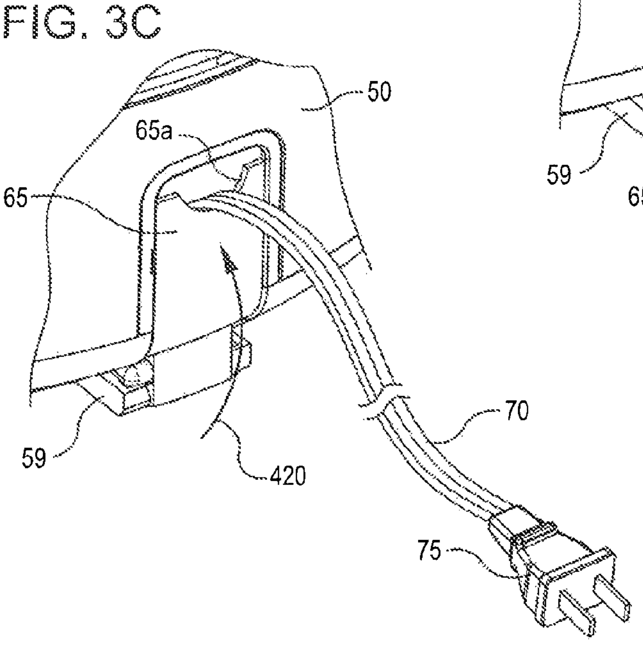

In order to utilize the power cord 70 and the cord plug 75, the locking feature 65 may be moved from the closed position (FIG. 3A) in the direction of arrow 410 to the open position (FIG. 3B). The cord plug 75 may now be pulled from within the pocket 60 in the direction of the arrow 430 and the power cord 70 extended from within the body of the housing 50 through the pocket 60. Upon moving the locking feature 65 to the open position, the housing 50 may freely rotate in the direction of arrow 400. When a desired amount of the power cord 70 is extended from within the housing 50 (as designated by 70' and the plug 75'), it may be desired to lock the rotation of the housing 50 during use. This is done by moving the locking feature 65 in the direction of arrow 420 (FIG. 3C) to the closed position. A specially formed cutout 65*a* on the end of the locking feature 65 allows the power cord 70 to extend from the pocket 66 while the locking feature 56 is in the closed position. After use, the power cord 70 may be retracted within the housing 50 by moving the locking feature 65 to the open position and rotating the housing 50. This causes the power cord 70 to wind internally inside a cavity (not shown) formed between the bottom housing cover 45 and the base 60. The power cord 70 may be wound into this cavity (not shown) in this manner until the plug 75 is again seated within the pocket 66. Upon alignment of the locking feature 65 with the pocket 66, the locking feature 65 may be folded into the pocket 66 and locked therein to prevent relative rotational movement of the housing 50 with respect to the base 50.

In an embodiment, the bottom housing 40 is rotatably connected to the base 60 via an upper rotation ring 41 that rests on top of an upper rotation ring 41 with a plurality of circumferentially spaced ball bearings 42 seated in pockets sandwiched therebetween. The upper rotation ring 41 is attached to the lower side of the bottom housing 40 with fasteners such as screws and the like. The lower rotation ring 43 is sandwiched between a securing ring 44 and the upper rotation ring 41 and fastened to the bottom housing 40 using fasteners such as screws and the like. A bottom housing cover 45 is attached to the lower rotation ring 43 such that the securing ring 44 is sandwiched between the bottom housing cover 45 and the lower rotation ring 43. In addition, the bottom housing cover 45 is attached to the bottom housing 40 such that the lower rotation ring 43, securing ring 44 and the upper securing ring 41 are sandwiched between the bottom housing cover 45 and the bottom housing 40. The housing 50 and the upper housing 55 is attached to the bottom housing 40 with fasteners such as screws and the like. The resulting assembly allows the housing 50 and upper housing 55 to rotate relative to the base 60 in either clockwise or counter-clockwise directions.

Referring now also to FIGS. 4 and 4A, a rotary electrical joint assembly connects electrical power from the end of the electrical power cord 70 that terminates in the cavity (not shown) between the bottom housing cover 45 and the base 60 to the rheostats 27 and the electrical heating elements 25 in the housing 50. The rotary electrical joint assembly is comprised of an upper rotary joint portion 46 disposed above the bottom housing 40 that interconnects with a lower rotary joint 47 disposed beneath the bottom housing cover 45. The lower rotary joint 47 fits into a socket in the upper rotary joint 46 and is rotatable therein. The lower rotary joint 47 has an outer circular wall 47*a*, an inner circular wall 47*b* concentric with the outer wall 47*a*, a central post 47*c* and a circular recess 47*d* between the outer and inner circular walls 47*a*, 47*h* and a recess 47*e* between the inner circular wall 47*b* and the central post 47*c*. An electrical contact sits on the bottom of each of the circular recesses 47*d*, 47*e* and on top of the central post 47*c*. The electrical contacts (not shown) are interconnected to the electrical power cord 70. The upper rotary joint 46 has a circular sidewall 46*a* and two inner metallic concentric circular rings 46*h*, 46*c*. The outermost of the inner metallic rings 46*b* is separated from the outer sidewall 46*a* by a recess. The innermost of the metallic rings 46*c* is also separated from the inner metallic ring 46*b* sidewall by a recess. The metallic rings 46*b*, 46*c* are connected to the electrical wiring connected to the supply side of the rheostats 27. An electrical contact (not shown) is disposed at the center on the inner side of the upper rotary joint portion 46. The electrical contact is also connected to electrical wiring attached to the supply side of the rheostats 27.

As a result, when the lower rotary joint portion 47 is inserted into the upper rotary joint portion 46 the upper edges of the inner metallic concentric circular ring 46*c* of the upper rotary joint portion 46 contact the electrical contacts (not shown) disposed in the concentric circular recesses of the lower rotary joint portion 47. In addition, the electrical contact (not shown) in the top of the upper rotary electrical joint portion 46 makes electrical contact with the electrical contact on the post of the lower rotary joint portion 47. Thus, electrical contact is maintained from the electrical contacts (not shown) in the lower rotary joint portion 47 to the concentric inner metallic rings 46*h*, 46*c* in the upper rotary joint portion 46 and the electrical contact (not shown) at the top of the upper rotary joint portion 46 as the upper rotary joint portion 46 is rotated relative to the lower rotary joint portion 47. This enables the bottom housing 40 and the housing 50 to rotate relative to the base 60 while maintaining electrical power from the power cord 70 to the rheostats 27, 27, 27 and the heating elements 25, 25, 25.

Referring now to FIG. 5, shown is an embodiment of a food heating and serving appliance 10. The appliance 10 may include a cover 80 of transparent material or opaque material such as thermoplastic but this not meant to be limiting. The cover 80 secures the lids 15 to the containers 14 and the containers 14 to the housing 15 for storage and transport. The cover 80 urges against the knobs 16 on the lids 15 which hold the lids 15 securely to the containers 14. The cover 80 may be secured to the housing 80 with fasteners such as clips, fastening straps and slings, or a snap-on fit. When not in the storage position shown in the illustration, the cover 80 may be used as a bowl for serving food items including potato chips, nachos, vegetables and the like.

All references cited herein are expressly incorporated by reference in their entirety.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention.

What is claimed is:

1. An appliance, comprising:
- a first portion;
- a second portion rotatably mounted to and rotatable relative to the first portion;
- an electrical power cord which when connected to a source of electrical power supplies the electrical power to at least one electrical component associated with the first portion;
- a pocket in the first portion; and
- a cover pivotally connected to the second portion that folds between unfolded and folded positions, said cover when aligned with the pocket is foldable into the pocket and snaps into therein, said cover enclosing the pocket and preventing relative rotational movement of the upper portion when folded into and snapped into the pocket.

2. The appliance of claim 1, further comprising:
- an electrical power plug on one end of the electrical power cord, said electrical power cord extensible and retractable from within a cavity formed between the first portion and the second portion, said electrical power cord extensible and retractable from within said cavity when the cover is in the unfolded position.

3. The appliance of claim 2, further comprising:
- a cutout on the cover configured to allow the electrical power cord to pass from within the cavity through the pocket for further connecting the electrical power plug to a source of electrical power when the electrical power cord is extended from within the cavity and the cover is in the folded position.

4. The appliance of claim 2, further comprising:
- an electrical power plug on one end of the electrical power cord, said electrical power plug is storable in the pocket when the electrical power cord is retracted and the cover is in the folded position.

5. A food heating appliance, comprising:
- an upper portion;
- at least one container removably mounted in a cavity of the upper portion for holding foodstuff;
- at least one heating element associated with each at least one container for heating the foodstuffs in the associated at least one container;
- a base portion, said upper portion rotatably mounted on and rotatable relative to the base portion; and
- a rotary electrical joint that transfers electrical power from an electrical power cord in the base portion to the at least one heating element associated with the at least one container in the rotatable upper portion.

6. The food heating appliance of claim 5, further comprising:
- a pocket in a sidewall of the upper portion; and
- a folding cover attached to the base portion pivotal between folded and unfolded positions, said folding cover that when aligned with the pocket is foldable into the pocket and snaps into therein, said folding cover enclosing the pocket and preventing relative rotational movement of the upper portion when folded into and snapped in the pocket.

7. The food heating appliance of claim 6, further comprising:
- an electrical power plug on one end of the electrical power cord, said electrical power cord extensible and retractable from within a cavity formed between the upper portion and the base portion, said electrical power cord extensible and retractable from said cavity when the folding cover is in the unfolded position.

8. The food heating appliance of claim 6, further comprising:
- a cutout on the cover configured to allow the electrical power cord to pass from within the cavity through the pocket for further connecting the electrical power plug to a source of electrical power when the electrical power cord is extended from within the cavity and the cover is in the folded position.

9. The food heating appliance of claim 6, further comprising:
- an electrical power plug on one end of the electrical power cord, said electrical power plug is storable in the pocket when the electrical power cord is retracted and the cover is in the folded position.

10. The food heating appliance of claim 5, wherein the upper and base portions are generally circular in shape.

11. The food heating appliance of claim 10, wherein the at least one container is at least two containers arranged evenly spaced circumferentially-wise about the upper portion.

12. The food heating appliance of claim 11, wherein the at least two containers are three containers arranged evenly spaced 120° circumferentially-wise about the upper portion.

13. The food heating appliance of claim 5, wherein the at least one container is comprised of ceramic material.

14. A latching arrangement for an appliance, comprising:

a pocket formed in a first portion of the appliance; and a cover pivotally connected to a second portion of the appliance rotatably connected to the first portion, said cover folding between unfolded and folded positions, said cover when aligned with the pocket is foldable into the pocket and snaps into therein, and said cover enclosing the pocket and preventing relative rotational movement of the first portion when folded into and snapped into the pocket.

15. The latching arrangement of claim 14, further comprising:

a cutout on the cover configured to allow an electrical power cord originating in and extending from a cavity formed between the first and second portions of the appliance to pass through from within the pocket for further connecting the electrical power cord to a source of electrical power when the cover is in the folded position.

16. The latching arrangement of claim 15, wherein an electrical power plug on one end of the electrical power cord is storable in the pocket when the electrical power cord is retracted into the cavity and the cover is in the folded position.

17. A food heating appliance, comprising:

an upper portion;

at least one container removably mounted in a cavity of the upper portion for holding foodstuff;

at least one heating element associated with each at least one container for heating the foodstuffs in the associated at least one container;

a base portion, said upper portion rotatably mounted on and rotatable relative to the base portion;

a rotary electrical joint that transfers electrical power from an electrical power cord in the base portion to the at least one heating element associated with the at least one container in the rotatable upper portion;

a pocket in a sidewall of the upper portion; and a folding cover attached to the base portion pivotal between folded and unfolded positions, said folding cover that when aligned with the pocket is foldable into the pocket and snaps into therein, said folding cover enclosing the pocket and preventing relative rotational movement of the upper portion when folded into and snapped in the pocket.

18. The food heating appliance of claim 17, further comprising:

an electrical power plug on one end of the electrical power cord, said electrical power cord extensible and retractable from within a cavity formed between the upper portion and the base portion, said electrical power cord extensible and retractable from said cavity when the folding cover is in the unfolded position.

19. The food heating appliance of claim 17, further comprising:

a cutout on the cover configured to allow the electrical power cord to pass from within the cavity through the pocket for further connecting the electrical power plug to a source of electrical power when the electrical power cord is extended from within the cavity and the cover is in the folded position.

20. The food heating appliance of claim 17, further comprising:

an electrical power plug on one end of the electrical power cord, said electrical power plug is storable in the pocket when the electrical power cord is retracted and the cover is in the folded position.

* * * * *